US007310730B1

(12) United States Patent
Champagne et al.

(10) Patent No.: US 7,310,730 B1
(45) Date of Patent: Dec. 18, 2007

(54) METHOD AND APPARATUS FOR COMMUNICATING AN ENCRYPTED BROADCAST TO VIRTUAL PRIVATE NETWORK RECEIVERS

(75) Inventors: Jean-Philippe Champagne, Goleta, CA (US); Bruce Lueckenhoff, Santa Barbara, CA (US); Matthew Gnagy, Santa Barbara, CA (US); James Aviani, Montecito, CA (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

(21) Appl. No.: 10/447,191

(22) Filed: May 27, 2003

(51) Int. Cl.
*H04L 9/00* (2006.01)
(52) U.S. Cl. .............. 713/163; 713/150; 713/151; 713/168; 713/171; 713/153; 709/223; 709/225; 709/227; 709/228; 709/231
(58) Field of Classification Search ............ 713/151, 713/153, 163, 150, 168, 171; 709/223, 227, 709/225, 228, 231
See application file for complete search history.

(56) References Cited

U.S. PATENT DOCUMENTS

| | | |
|---|---|---|
| 5,103,479 A | 4/1992 | Takaragi et al. |
| 5,483,598 A | 1/1996 | Kaufman et al. |
| 5,889,860 A | 3/1999 | Eller et al. |
| 6,021,203 A | 2/2000 | Douceur et al. |
| 6,169,805 B1 | 1/2001 | Dunn et al. |
| 6,199,165 B1 | 3/2001 | Grunner |
| 6,205,488 B1 | 3/2001 | Casey et al. |
| 6,363,357 B1 | 3/2002 | Rosenberg et al. |
| 6,487,600 B1 * | 11/2002 | Lynch .................. 709/229 |

(Continued)

FOREIGN PATENT DOCUMENTS

WO    WO-03/067808 A1    8/2003

OTHER PUBLICATIONS

Cisco Systems, Inc., "MPLS Virtual Private Networks (VPNs)," *Cisco IOS Release 12.0(21)ST*, Sep. 26, 2002, pp. 1-12.

(Continued)

*Primary Examiner*—Kim Vu
*Assistant Examiner*—Beemnet W Dada
(74) *Attorney, Agent, or Firm*—Hickman Palermo Truong & Becker LLP

(57) ABSTRACT

A method of communicating an encrypted data broadcast to a plurality of virtual private network receivers is disclosed. A first communication channel is established between a first one of the receivers and a network node. A private data stream is communicated to the first receiver on the first channel. A request is received from the first receiver to join a broadcast data stream that is directed to a plurality of receivers by a broadcast server. A second encrypted communication channel is established between the first receiver and the network node for purposes of carrying the broadcast data stream. Decryption information, which the first receiver can use to decrypt information that is sent on the second channel, is sent to the first receiver through the first channel. The broadcast data stream is then communicated to the first receiver on the second channel. As a result, a particular receiver can receive an encrypted broadcast that is encrypted as part of a single session for a large plurality of other receivers, without impacting separate, private encrypted communications conducted by the particular receiver.

25 Claims, 5 Drawing Sheets

U.S. PATENT DOCUMENTS

| | | | |
|---|---|---|---|
| 6,614,800 B1 * | 9/2003 | Genty et al. ................ | 370/464 |
| 6,801,538 B1 | 10/2004 | Abi-Nassif et al. | |
| 6,865,672 B1 | 3/2005 | Carmeli | |
| 6,870,842 B1 * | 3/2005 | Caronni et al. ............. | 370/390 |
| 6,879,603 B1 | 4/2005 | Koenig et al. | |
| 6,915,437 B2 * | 7/2005 | Swander et al. ................ | 726/1 |
| 6,928,420 B1 | 8/2005 | Kurihara et al. | |
| 6,938,169 B1 | 8/2005 | Caronni et al. | |
| 6,970,941 B1 * | 11/2005 | Caronni et al. ............. | 709/238 |
| 6,976,177 B2 * | 12/2005 | Ahonen ......................... | 726/3 |
| 7,047,562 B2 * | 5/2006 | Peterson et al. .............. | 726/14 |
| 7,181,542 B2 * | 2/2007 | Tuomenoksa et al. ...... | 709/250 |
| 7,203,957 B2 * | 4/2007 | Balissat et al. ............... | 726/15 |
| 2002/0035556 A1 | 3/2002 | Shah et al. | |
| 2002/0146119 A1 | 10/2002 | Liss | |
| 2003/0002675 A1 | 1/2003 | Graunke | |
| 2003/0005435 A1 * | 1/2003 | Nelger et al. ................. | 725/31 |
| 2004/0142661 A1 * | 7/2004 | Lane et al. ................ | 455/41.2 |

OTHER PUBLICATIONS

Cisco Systems, Inc., MPLS Virtual Private Networks (VPNs), *Cisco IOS Release 12.0(22)S*, Sep. 13, 2002, pp. 1-12.

Cisco Systems, Inc., "Deploying IPsec Virtual Private Networks," Apr. 9, 2003, pp. 1-29.

Cisco Systems, Inc., "MPLS Virtual Private Networks," *Cisco IOS Release 12.0(5)T*, Jan. 16, 2003, pp. 1-50.

Cisco Systems, Inc., "How to Build a Secure WLAN," Nov. 27, 2002, http://www.cisco.com/pcgi-bin/SWT/print.pl, printed Nov. 06, 2003, pp. 1-4.

Cisco Systems, Inc., "Cisco Systems Announces First High-Performance Cable Modem for Small Office, Home Office and Telecommuting Environments," Press Release, Sep. 21, 1998, http://www.cisco.com/pcgi-bin/SWT/print.pl, printed Nov. 06, 2003, pp. 1-2.

Cisco Systems, Inc., "MPLS Virtual Private Networks (VPNs)," *Cisco IOS Release 12.0(23)S*, Jan. 17, 2003, pp. 1-48.

Cisco Systems, Inc., "Configuring Virtual Private Networks," *Cisco IOS Dial Technologies Configuration Guide*, Jul. 1, 200, pp. DC-507-DC572.

Cisco Systems, Inc., "MPLS Virtual Private Networks (VPNs)," *Cisco IOS Release 12.2(13)T*, Jan. 14, 2003, pp. 1-48.

Cisco Systems, Inc., "Wireless Virtual LAN Deployment Guide," Feb. 18, 2003, pp. 1-35.

Cisco Systems, Inc., "Secure Managed VPN Services for Cable Operators," Jul. 29, 2003, pp. 1-7.

Cisco Systems, Inc., "The Cisco 1600 Series," Jan. 20, 2003, 17 pages.

Cisco Systems, Inc., "Configuring Dial Backup Using Dialer Watch," Jan. 16, 2003, pp. DC-509-DC514.

Cisco Systems, Inc., "Appendix C, Viewing Sample Configuration Files," *Cisco uBR7200 Series Universal Broadband Router Software Configuration Guide*, Apr. 21, 2003, pp. C-1-C18.

Cisco Systems, Inc., "Cisco Aironet Wireless LAN Security Overview," Jan. 22, 2003, pp. 1-9.

Cisco Systems, Inc., "PPTP with MPPE," *Cisco IOS Release 12.1(5)T*, Jan. 16, 2003, pp. 1-26.

R. Shirey, RFC 2828 Internet Security Glossary, May 2000, 7 pages.

X.M. Mei et al., "Cryptography Decrypted," 2001, pp. 58-59.

B. Schneier, Applied Cryptography: Protocols, Algorithms, and Source Code in C, $2^{nd}$ ed. 1996, pp. 13-17.

XP002240900, W. Stallings, Cryptography and Network Security Principles & Practice, $2^{nd}$ ed. 1999, chap. 2, Conventional Encryption: Classical Techiques, pp. 38-41.

International Preliminary Examining Authority, International Preliminary Examination Report for application PCT/US03/02807, Mar. 12, 2004, 9 pages.

B. Schneier, Applied Cryptography: Protocols, Algorithms, and Source Code in C, $2^{nd}$ ed. 1996, pp. 176-177.

B. Schneier, Applied Cryptography: Protocols, Algorithms, and Source Code in C, $2^{nd}$ ed. 1996, pp. 226.

European Patent Office, International Search Report for application PCT/US03/02807, Jun. 4, 2003, 4 pages.

* cited by examiner

METHOD AND APPARATUS FOR COMMUNICATING AN ENCRYPTED BROADCAST TO VIRTUAL PRIVATE NETWORK RECEIVERS

FIELD OF THE INVENTION

The present invention generally relates to network communication of information. The invention relates more specifically to a method and apparatus for communicating an encrypted data broadcast to a plurality of virtual private network receivers.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Virtual private network (VPN) technology is now widely used to provide secure communication of information over public or non-trusted networks. In a typical VPN arrangement, an end user is associated with an end station device, such as a workstation or personal computer, which executes VPN client software. The end station establishes a connection through a non-trusted network, such as the public Internet, to a gateway or other network node associated with a secure network of a business enterprise or other entity. The end station and network node negotiate encryption keys, essentially creating an encrypted "tunnel" connection through the un-trusted network. The end station and network node then communicate encrypted information over the un-trusted network, and the encrypted information is decrypted at the endpoints.

In this arrangement, the end user can securely obtain information from private network resources through the VPN tunnel, even though one or more intermediate networks are un-trusted. Typical VPN users are enterprise workers who telecommute or telework.

Such users of VPNs may wish to participate in other kinds of network communications, such as broadcasts of audio or video information. For example, assume that a business enterprise has numerous VPN users at locations remote from the headquarters of the enterprise. The enterprise may wish to establish a live broadcast event that uses Internet Protocol television (IPTV) protocol. An example of such an event might be a company meeting that all enterprise employees can view.

Some of the VPN users may receive the broadcast through unicast, such that the IPTV data is encrypted using the VPN tunnel associated with the VPN user. To support this operation, for each VPN telecommuter, a separate private encrypted session exists at a VPN processing device associated with the enterprise. However, this arrangement does not scale well for large broadcasts. For example, if 1,000 VPN telecommuters are online for a given broadcast, the VPN device at the enterprise must encrypt the broadcast event in 1,000 different encryption streams. This places a significant computing burden on the VPN device.

Further, communicating broadcast media information using a VPN tunnel may significantly reduce the amount of bandwidth available to the VPN end user for other communications. Such end users may need to perform other kinds of communication such as email, telnet sessions or HTTP browsing using information that is specific to a particular end user. Because broadcast media typically have high bandwidth requirements, communicating such broadcasts on a large number of VPN sessions may exceed the maximum available encryption throughput of the VPN device. As a result, end users may be unable to communicate the user-specific information when a broadcast is in process.

To illustrate these issues, FIG. 1 is a block diagram of a VPN arrangement in which a broadcast is communicated to multiple receivers. Within a trusted network domain 100, a broadcast server 102 generates a flow of broadcast packets that are directed to one or more receivers. Broadcast server 102 is communicatively coupled to the receivers through a local area network 104, VPN concentrator 106, and network 108. In one embodiment, the receivers comprise VPN clients 114A, 114B, 114C which are located in a non-trusted domain 110. Each receiver is associated with a network end station device. For example, VPN client 114A is associated with a workstation 116A, VPN client 114B is associated with a personal computer 116B, and VPN client 114C is associated with server 116C.

In this arrangement, the receivers can securely obtain resources from LAN 104 by establishing encrypted VPN links 112A, 112B, 112C that terminate at VPN concentrator 106. For example, a telecommuter using workstation 116A could retrieve email from a server located in LAN 104 using encrypted communications over link 112A. The receivers may also wish to participate in a broadcast that originates at broadcast server 102. However, to do so in the arrangement of FIG. 1, link 112A must carry the encrypted broadcast along with private encrypted traffic directed to workstation 116A. Moreover, VPN concentrator 106 must encrypt the same broadcast traffic repeatedly for each end user, using different encryption keys that are individually negotiated with each of the VPN clients 114A, 114B, 114C.

Since the broadcast data is the same for all end users who are receiving it, and since the broadcast data requires a high proportion of the download bandwidth to the user, benefits would accrue from an approach in which the broadcast data is encrypted into a single encryption session.

Thus, there is a need for a method or apparatus that can separate user-specific encrypted data traffic from encrypted broadcast traffic that is common to a group of users.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
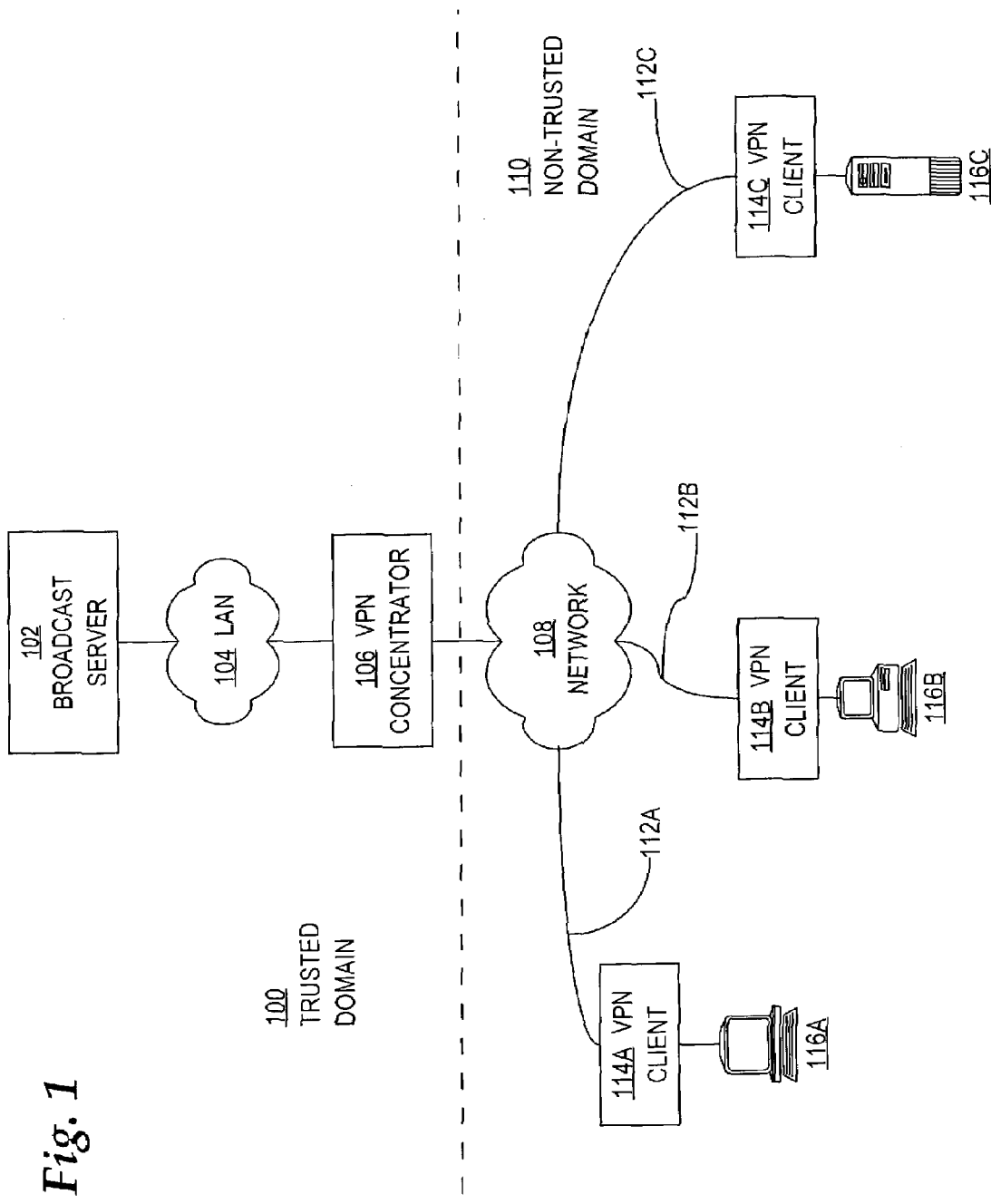
FIG. 1 is a block diagram of a VPN arrangement in which a broadcast is communicated to multiple receivers.

A method and apparatus for communicating an encrypted data broadcast to a plurality of virtual private network receivers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Communicating an Encrypted Data Broadcast to Virtual Private
Network Receivers
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method for communicating an encrypted data broadcast to a plurality of virtual private network receivers. A first communication channel is established between a first one of the receivers and a network node. A private data stream is communicated to the first receiver on the first channel. A request is received from the first receiver to join a broadcast data stream that is directed to a plurality of receivers by a broadcast server. A second encrypted communication channel is established between the first receiver and the network node for purposes of carrying the broadcast data stream. Decryption information, which the first receiver can use to decrypt information that is sent on the second channel, is sent to the first receiver through the first channel. The broadcast data stream is then communicated to the first receiver on the second channel.

As a result, a particular receiver can receive an encrypted broadcast that is encrypted as part of a single session for a large plurality of other receivers, without impacting separate, private encrypted communications conducted by the particular receiver.

In one implementation, the network node is a VPN concentrator. Other implementations may be performed using routers, gateways, access servers, or other network nodes that process VPN connections.

According to one feature, each particular receiver among the plurality of receivers is communicatively coupled to the network node by a receiver-specific first channel, which carries only a private data stream specific to that particular receiver. The particular receiver is also coupled to the network node by the second channel, which carries only the broadcast stream. The broadcast stream is decrypted using the same decryption information that was provided to the first receiver. In another feature, the network node detects that a broadcast server has created a broadcast event, and automatically creates a common encryption session that is associated with the second channel.

Further, in another feature, the decryption information provided to the receiver comprises an encryption dictionary and a frame number. In a related feature, the first receiver begins recording the broadcast data stream from the specified frame number and uses the encryption dictionary to decrypt the broadcast data stream.

In still another feature, the network node determines that a new receiver has requested to join the broadcast data stream, negotiates a new decryption key among the network node and all receivers then in the group, and distributes the new decryption key to all current receivers and to the new receiver. In certain embodiments, the broadcast data stream may be encapsulated using GRE, and the encapsulated broadcast data stream may be multicast to the first receiver and all other receivers.

The broadcast data stream may be generated by a broadcast server, the network node may be a VPN concentrator, and each of the receivers may be a VPN client. Each of the receivers may be a VPN client having a first decryption engine for decrypting the private data stream and a second decryption engine for decrypting the broadcast data stream. The network node may be a VPN concentrator having X+1 encryption/decryption engines, where X is a number of the receivers.

In other aspects, the invention encompasses a computer apparatus and a computer-readable medium configured to carry out the foregoing steps.

Figure 2:
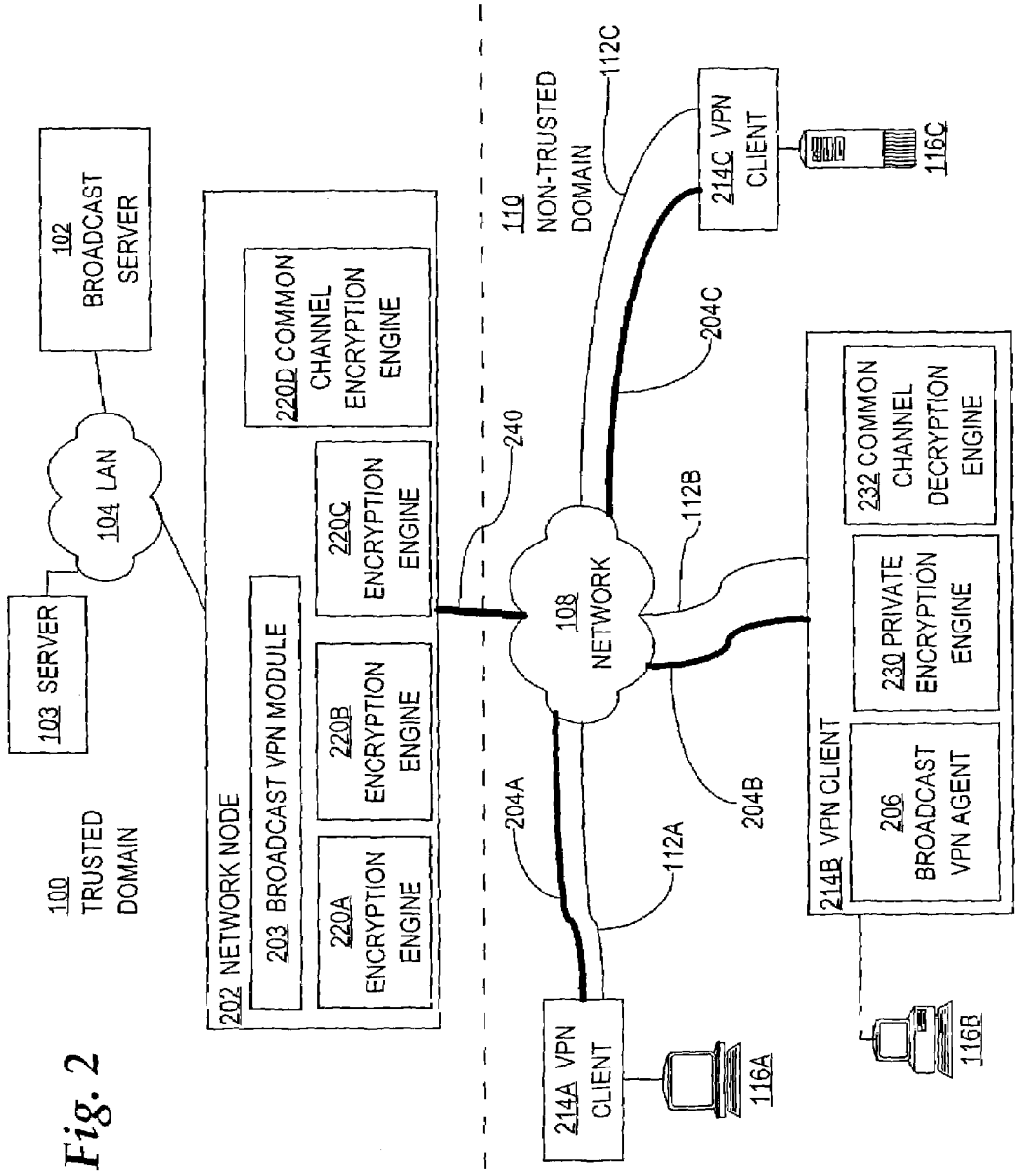
FIG. 2 is a block diagram of a network arrangement showing communicating an encrypted data broadcast to a plurality of virtual private network receivers.

2.0 Communicating an Encrypted Broadcast to Virtual Private Network Receivers 2.1 Structural Overview FIG. 2 is a block diagram of a network arrangement for communicating an encrypted data broadcast to a plurality of virtual private network receivers.

Within trusted network domain 100 a broadcast server 102 generates broadcast packets. Broadcast server 102 is communicatively coupled to the receivers through a local area network 104, network node 202, and network 108. In one embodiment, the receivers comprise VPN clients 214A, 214B, 214C which are located in a non-trusted domain 110. Each receiver is associated with a network end station device. For example, VPN client 214A is associated with a workstation 116A, VPN client 214B is associated with a personal computer 116B, and VPN client 214C is associated with server 116C. Thus, in FIG. 2, multiple remote users are directly connected to a central VPN device, and each user has a distinct unicast VPN session.

In this arrangement, the receivers can securely obtain resources from LAN 104 by establishing first encrypted VPN links 112A, 112B, 112C that terminate at network node 202. For example, a telecommuter using workstation 116A could retrieve email from a server 103 located in LAN 104 using encrypted communications over link 112A.

The receivers may also wish to participate in a broadcast that originates at broadcast server 102. Communication of broadcast data for a plurality of receivers occurs, however, over second encrypted VPN links 204A, 204B, 204C, etc. and is supported by network node 202 and VPN clients 214A, 214B, 214C. Line 240 collectively represents all links 112A, 112B, 112C, 204A, 204B, 204C that are communicatively coupled to network node 202.

Network node 202 may be any network infrastructure element that is suitable for processing VPN connections. Examples include the Cisco 3000 Series VPN Concentrators such as model 3005, 3015, 3030, 3060, 3080, etc. Network node 202 comprises a broadcast VPN module 203, a plurality of encryption engines 220A, 220B, 220C, etc., and a common channel encryption engine 220D. The broadcast VPN module 203 comprises one or more software or hardware elements that cooperate to supervise the creation, management, and takedown of second encrypted VPN links 204A, 204B, 204C. Broadcast VPN module 203 additionally may manage first encrypted VPN links 112A, 112B, 112C.

Encryption engines 220A, 220B, 220C, are responsible for encrypting and decrypting receiver-specific private data that is respectively associated with VPN clients 214A, 214B, 214C. Thus, network node 202 has a separate encryption engine for each VPN client that can encrypt and decrypt network traffic that is specific to each particular VPN client, using keys that are client-specific or negotiated individually with each VPN client. The common channel encryption engine 220D is responsible for encrypting broadcast traffic that is common to all the VPN clients, using common key material. The broadcast traffic is communicated on second encrypted VPN links 204A, 204B, 204C. In general, network node 202 has X+1 encryption engines, where X is the number of active VPN clients. Each of the encryption engines may be instantiated and terminated in conventional manner.

As an example, internal structural details are shown in FIG. 2 for VPN client 214B. Each VPN client 214A, 214B, 214C is provided with the same internal structure. There may be any number of VPN clients in a practical system.

VPN client 214B comprises a broadcast VPN agent 206, private encryption engine 230, and common channel encryption engine 232. The broadcast VPN agent 206 comprises one or more software or hardware elements that cooperate to supervise requests to create and use second encrypted VPN links 204A, 204B, 204C. Broadcast VPN agent 206 additionally may manage first encrypted VPN links 112A, 112B, 112C. In contrast, in past approaches VPN clients have no notion of supporting multiple VPN tunnels.

Private encryption engine 230 is responsible for encrypting and decrypting receiver-specific private data that is sent and received only by VPN client 214B on first encrypted VPN link 112B. The common channel encryption engine 232 is responsible for decrypting broadcast traffic that is common to all the VPN clients, which uses common key material and is communicated on second encrypted VPN link 204B. Thus, private encryption engine 230 typically negotiates keys with encryption engine 220, while common channel decryption engine 232 uses common keys provided by or negotiated with common channel encryption engine 220D.

The encryption engine 220 and decryption engine 232 each maintain separate metadata relating to encryption or decryption, such as encryption dictionaries. Further, VPN client 214B is provided with logic that can manage the metadata and control concurrent encryption and decryption operations by the engines 220, 232.

2.2 Operational Methods

Figure 3:
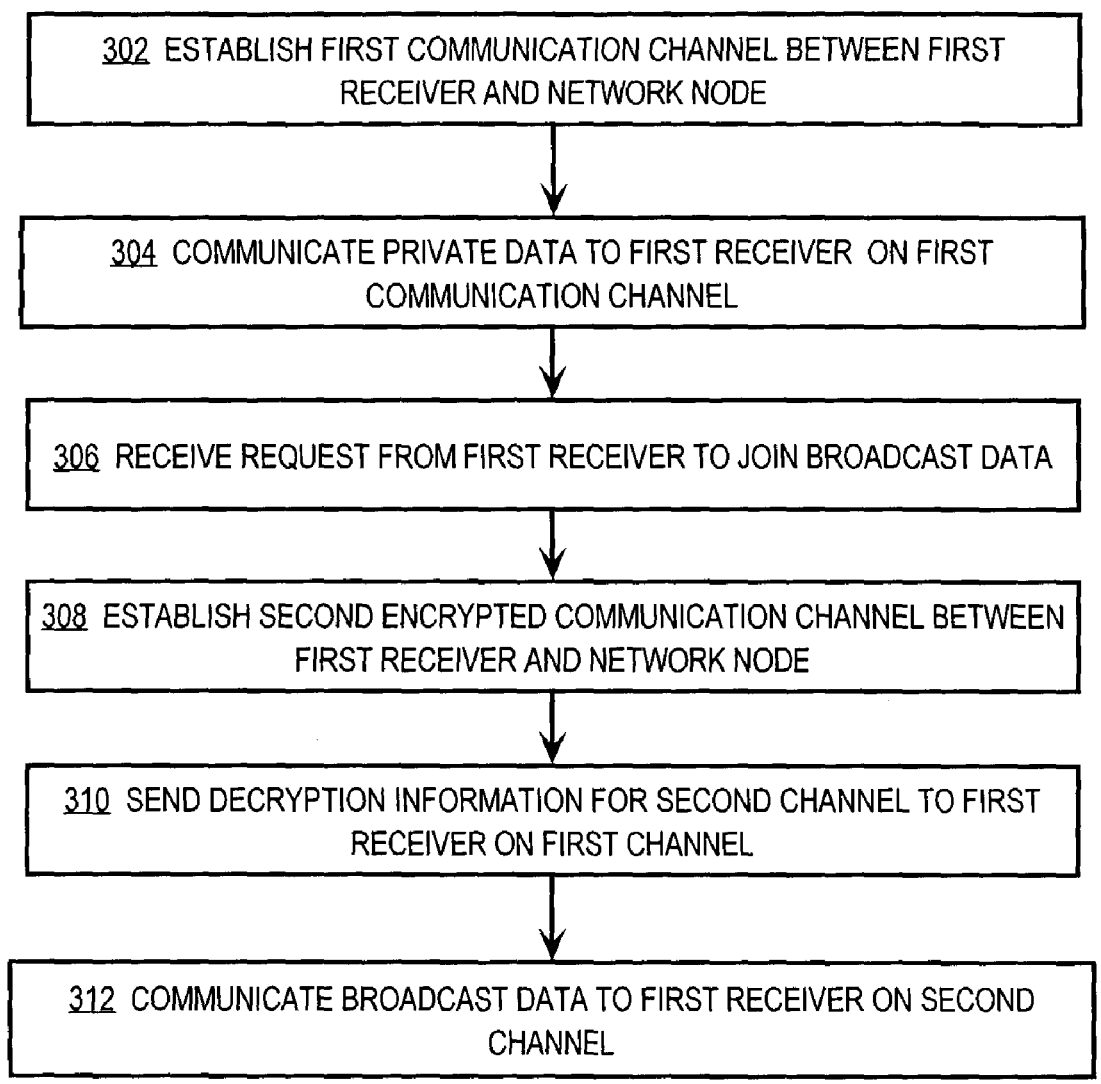
FIG. 3 is a flow diagram of an approach for communicating an encrypted data broadcast to a plurality of virtual private network receivers.

FIG. 3 is a flow diagram of an approach for communicating an encrypted data broadcast to a plurality of virtual private network receivers. For purposes of illustrating a clear example, the approach of FIG. 3 is described below with reference to the example network arrangement of FIG. 2. However, embodiments of FIG. 3 are not limited to the context of FIG. 2.

In block 302, a first communication channel is established between a first receiver and a network node. For example, network node 202 receives a request to create a VPN connection from VPN client 214B, executed at personal computer 116B. In response, an element of network node 202, which may be broadcast VPN module 203, negotiates encryption keys with the VPN client 214B and establishes a VPN connection on link 112B. Negotiating encryption keys may involve performing Internet Key Exchange (IKE) as part of establishing a session under the Security Protocol for the Internet (IPSec), as described in IETF RFC 2401.

In block 304, private data is communicated to the first receiver on the first communication channel. The private data is specific to the first receiver and is sent only to the first receiver. For example, the private data may comprise email, server resources, telnet session data, or any other data that is requested by the first receiver. Block 304 may involve receiving private data originating at server resource 103, encrypting the private data by encryption engine 220B, sending the private data in encrypted form through network 108 to VPN client 214B over link 112B. At the VPN client 214B, the private data may be decrypted by private encryption engine 230.

In block 306, a request from the first receiver to join a broadcast is received. The request may be an HTTP or RTSP request. For example, network node 202 receives a request from VPN client 214B to join a broadcast data stream originating at broadcast server 102. VPN client 214B may provide the request to the network node 202 by relaying a selection of a link or UR-L associated with broadcast server 102 that is made by an end user at personal computer 116B. In this context, a "broadcast" or "broadcast event" refers to an event that ideally is multicasted, such as live streaming audio, video streaming, etc.

In block 308, a second encrypted communication channel is established between the first receiver and the network node. For example, broadcast VPN module 203 of network node 202 cooperates with broadcast VPN agent 206 of VPN client 214B to establish the second encrypted VPN link 204B for the purpose of carrying broadcast traffic. Thus, in an embodiment, when a user wants to join a broadcast event, a new VPN session using unicast is initiated between the VPN client and a network node such as a VPN concentrator.

In an alternative embodiment, block 308 is performed immediately after, or concurrently with, block 302. Thus, in this alternative, the second encrypted communication channel is established before it is actually needed, and maintained continuously until a broadcast or other communication occurs.

In block 310, decryption information for the second channel is sent to the first receiver on the first channel. For example, broadcast VPN module 203 or common channel encryption engine 220D of network node 202 sends, to VPN client 214B, information sufficient to enable common channel decryption engine 232 of the VPN client to decrypt encrypted broadcast traffic arriving on link 204B.

In this approach, the decryption information is exchanged through the existing secured VPN session. Sufficient information is provided to allow this new user joining the broadcast event to decrypt the stream regardless of when the user joined the event. In one specific approach, when a new user joins, network node 202 can re-sync the broadcast encryption stream to match a new common key, and send the new key to all users over the first channel. Keys also may be re-negotiated and distributed when a receiver leaves the broadcast.

In another approach, network node sends, only to the new user joining the event, the entire encryption dictionary maintained by common channel encryption engine 220D for the common broadcast session, with a frame number or other value representing the then-current time frame in the stream. In this context, the term "encryption dictionary" refers to a complete keystream as used in certain block streaming ciphers such as RC4, or information sufficient to generate a keystream, or any other information sufficient to enable a client to decrypt the common broadcast session. The specific encryption algorithm and decryption information that are used are not critical.

This information also is provided using the existing private VPN tunnel between the user and the VPN concentrator. By using an existing private VPN tunnel, in the form of link 112B, to exchange the encryption dictionary (or other information for which secure transmission is appropriate or necessary) to create a new session with common encryption, the need for re-syncing keys is avoided.

In block 312, the broadcast data is communicated to the first receiver on the second channel. For example, network node begins routing broadcast packets received from broadcast server 102 onto channel 204B.

The entire duration of the broadcasted event may be encrypted using a single key; alternatively, different portions of the event may use different keys, and the different keys may be provided to the VPN client on the first encrypted channel.

In one particular approach, the broadcast event is unicast to each receiver using IPSec for encryption on the broadcast channel. Alternatively, the broadcasted event can be transmitted using generic routing encapsulation (GRE). In this approach, the broadcast server 102 communicates the broadcast using multicast to all elements of LAN 104 or network 108 that support multicast, and uses unicast GRE tunnels for communication to clients through elements that do not support multicast. In this approach, for efficiency, the network element that originates the unicast streams could cache the broadcast stream.

This approach is most appropriate in an enterprise network environment in which certain elements are known to support multicast. A security header may be used in the encapsulated packets so that the VPN client can confirm that the source is an authorized VPN concentrator or other network node. Further, GRE approaches may use pre-configured keys rather than IKE.

The GRE approach also is useful in a managed enterprise content delivery network, in which the content delivery network of a particular business enterprise is managed by an Internet Service Provider (ISP). In this environment, the ISP could store the broadcast event as a confidential file in a cache local to a particular set of users. Such users then could retrieve, as Video-On-Demand, the broadcast event stored in the cache, which would be sent by unicast to the users.

Figure 4:
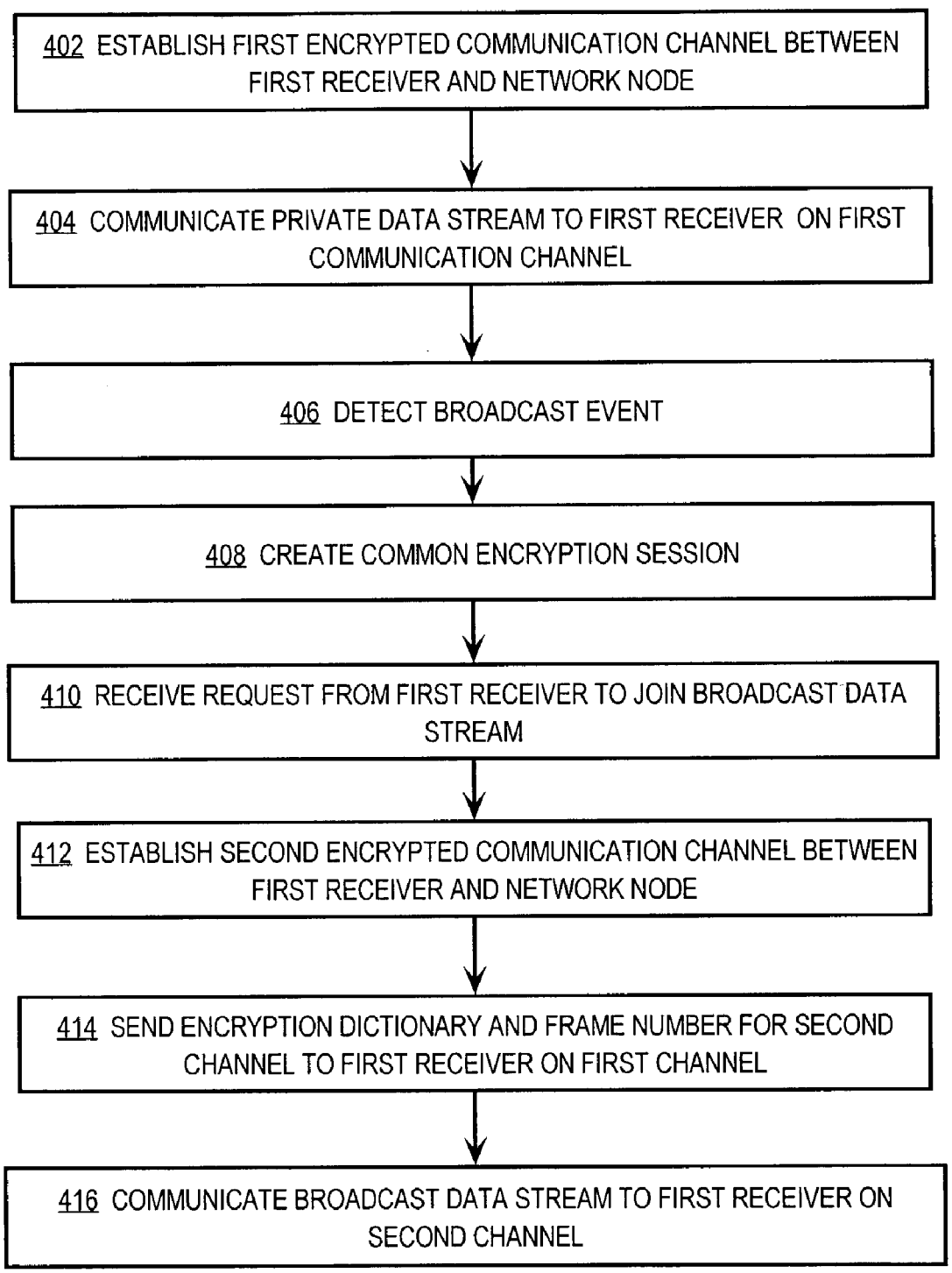
FIG. 4 is a flow diagram of another approach for communicating an encrypted data broadcast to a plurality of virtual private network receivers.

FIG. 4 is a flow diagram of another approach for communicating an encrypted data broadcast to a plurality of virtual private network receivers. For purposes of illustrating a clear example, the approach of FIG. 4 is described below with reference to the example network arrangement of FIG. 2. However, embodiments of FIG. 4 are not limited to the context of FIG. 2.

Block 402 of FIG. 4 corresponds to block 302 of FIG. 3. Block 404 of FIG. 4 corresponds to block 304 of FIG. 3.

In block 406, a broadcast event is detected. For example, network node 202 detects that broadcast server 102 has initiated a broadcast. Such detection may be performed using several approaches. For example, if the broadcast server 102 is multicasting the broadcast event, the network node may automatically detect that such an event requires a common encryption scheme for all VPN users. Alternatively, if the broadcast server does not use multicast, the VPN concentrator can detect that a broadcast event is occurring from request information in the protocol layers of event packets above the IP layer.

In another approach, network node 202 may maintain a table of network addresses of known nodes that send broadcasts. Packets received at network node 202 are then examined and a lookup in the table is performed to determine if a broadcast node is sending the packets.

In yet another approach, network node 202 uses Network-Based Application Recognition (NBAR), deep-packet inspection techniques, or other content-aware techniques to identify protocols associated with flows through the network node and determine which flows represent broadcasts. For example, if an NBAR agent in network node 202 indicates that RTSP is the protocol of packets sent by network node 202, then the network node can determine that a broadcast exists. Other criteria for recognizing a broadcast may be the number of receivers identified in a stream, the time of day at which broadcast server 102 sends packets, etc. In response to detecting a broadcast event, in block 408 a common encryption session is created. The common encryption session may be an IPsec session that is created for use with all receivers of the broadcast.

Block 410 and block 412 may involve the same steps, respectively, as block 306 and block 308 of FIG. 3. In block 414, after the second encrypted communication channel is established, an encryption dictionary and frame number for the second channel are sent to the first receiver using the first channel. The encryption dictionary and frame number enable the first receiver to identify a first of the broadcast flow on the second channel at which to begin decryption. The encryption dictionary provides decryption key material that can be used to decrypt the broadcast flow. The encryption dictionary and frame number are sent on the first channel, so that an existing secure channel is used for communication of the key material.

In block 416, the broadcast data stream is communicated to the first receiver on the second channel. The first receiver uses the encryption dictionary and frame number to decrypt the broadcast. In one specific embodiment, packets from broadcast server 102 are received at network node 202, encrypted using the common channel encryption engine 220D and using encryption keys that are common to all receivers of the same broadcast, and sent over network 108 on link 204B.

The strength of encryption performed by common channel encryption engine 220D can vary. For example, the VPN concentrator can implement policy-based encryption based on the Layer 3 or Layer 4 attributes of the traffic generated by the broadcast server. As a specific example, network node 202 may examine the type of request received from the VPN client 214B and determine that for a phone conference meeting, 64-bit encryption is used, whereas for a company all-hands meeting, 128-bit encryption is used, etc.

Thus, communicating an encrypted data broadcast to a plurality of virtual private network receivers generally involves providing functional components in a network node, such as a VPN concentrator, and in a VPN client. When a broadcast event is detected, in one embodiment the VPN concentrator creates a common encryption session. When the concentrator detects that a VPN client wants to join the broadcast, in the form of a specific HTTP or RTSP request, the concentrator provides to the VPN client the encryption dictionary with a frame number at which the broadcast starts. The encryption information is provided to the client through the current existing private VPN session. The client starts recording the broadcast event from the specified frame number and uses the encryption dictionary to decode the broadcast.

Using this approach, the first receiver receives the broadcast on a second VPN channel that is separate from the first channel that is used for its specific, private data. As a result, processing load on the network node 202 is substantially reduced because a single encryption engine may be used for broadcast traffic directed to a large number of receivers. Unlike prior approaches, the network node is not required to repeatedly encrypt the same broadcast data using different keys for different receivers.

Embodiments can achieve significant improvements in processing efficiency at the VPN concentrator or other network node. For example, if 90% of total bandwidth through a VPN concentrator is used for transmitting a broadcast event, each session is using 100 Kbps of bandwidth, and 400 users are receiving the broadcast, then the VPN concentrator would be required to provide 40 Mbps of encryption throughput. This is beyond the processing capability of many VPN concentrator devices. However, by using a single encrypted session for all broadcast traffic with the approaches described herein, the required throughput required would be 10 Kbps*400+90 Kbps=4.09 Mbps Since far less encryption processing capacity is required, a lower-end VPN concentrator could be used.

2.3 Implementation Alternatives

While certain embodiments herein have been described in the context of VPN networking in which network node 202 is a VPN concentrator. Other implementations may be performed using routers, gateways, access servers, or other network nodes that process VPN connections.

Further, other embodiments may be used in the context of so-called "Layer 2 VPNs." In this alternative, each of the end stations 116A, 116B, 116C is on a frame relay network, and each of the links 112A, 112B, 112C, 204A, 204B, 204C may appear on a different virtual circuit. Network 108 includes ATM or frame relay elements that support virtual circuits. In this embodiment, no encryption may be required at all. A modicum of security is inherent in the fact that the broadcast and private data streams are communicated on different individual virtual circuits that are not mingled with other network traffic, and because frame relay equipment typically is located in a secure physical environment. No encapsulation or tunneling is required in this approach.

In still another alternative, each of the end stations 116A, 116B, 116C is on two different VLANs. A first VLAN is associated with the private data and a second VLAN is associated with the broadcast data. The first and second VLANs may be implemented using wireless network technology such that first and second VLANs are maintained in connections between a single wireless access point and a client. In one approach, the VLANs are maintained using two separate wireless network interface cards at the client. In another approach, both VLANs are maintained over a single wireless network interface card using a spanning port approach.

In addition, other embodiments may be used with any other technology that supports encrypted channels for sending data to clients, whether or not designated as a VPN technology, now known or invented in the future.

3.0 Implementation Mechanisms—Hardware Overview

Figure 5:
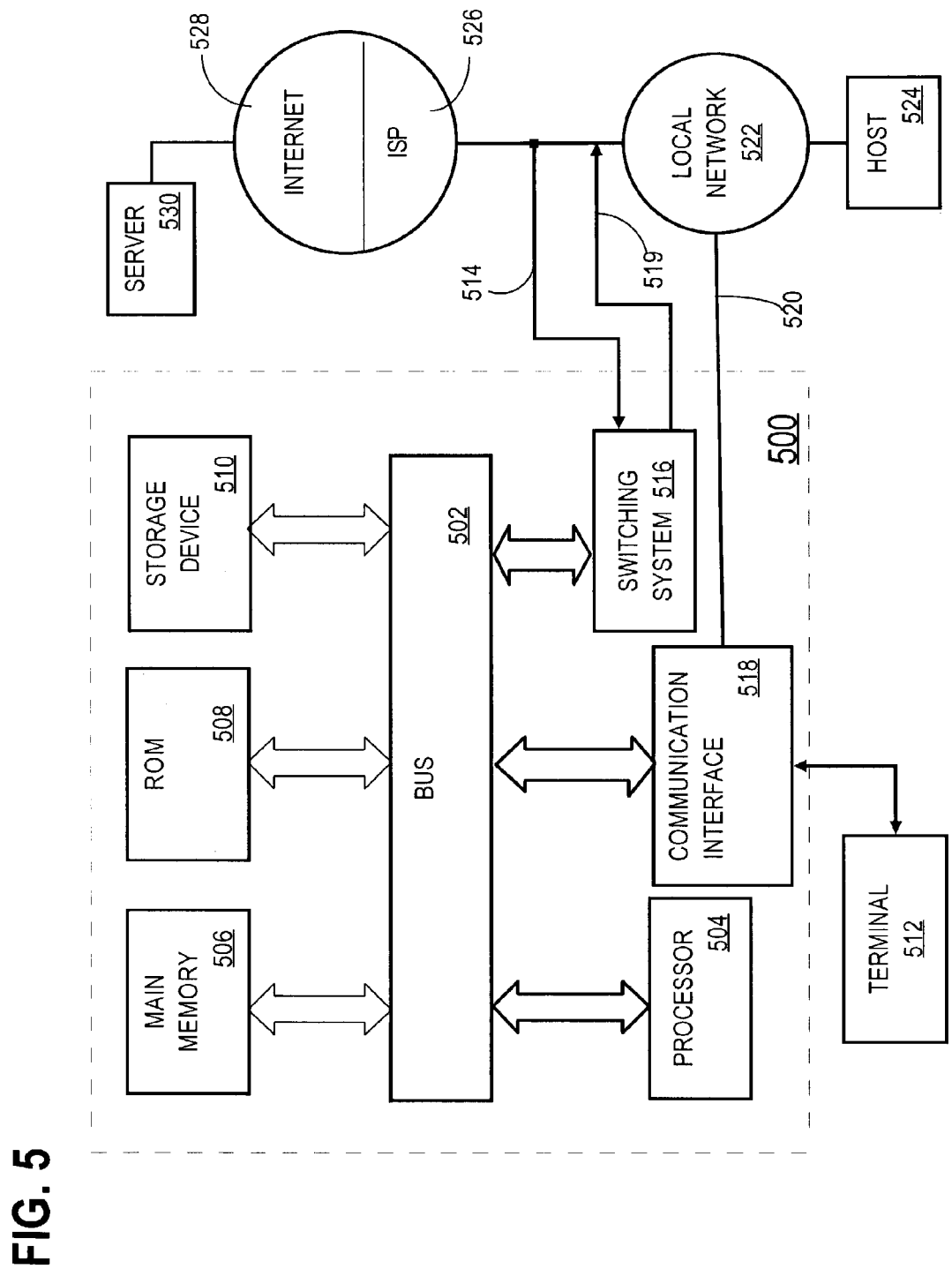
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for communicating an encrypted data broadcast to a plurality of virtual private network receivers. According to one embodiment of the invention, communicating an encrypted data broadcast to a plurality of virtual private network receivers is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for communicating an encrypted data broadcast to a plurality of virtual private network receivers as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of communicating an encrypted data broadcast to a plurality of virtual private network (VPN) receivers, the method comprising the steps of:
    using a VPN client computer program, establishing a first encrypted VPN channel between a first one of the receivers and a network node;
    communicating private data to the first receiver on the first VPN channel;
    receiving a request from the first receiver to join a broadcast data stream;
    using the same VPN client computer program, establishing a second encrypted VPN channel between the first receiver and the network node;
    sending, to the first receiver through the first VPN channel, decryption information with which the first receiver can decrypt information that is sent on the second VPN channel;
    wherein the decryption information comprises an encryption dictionary and a frame number, and wherein the first receiver begins recording the encrypted data broadcast from the specified frame number and uses the encryption dictionary to decrypt the encrypted broadcast data; and
    communicating the encrypted data broadcast to the first receiver on the second VPN channel.

2. A method as recited in claim 1, wherein the network node is a VPN concentrator.

3. A method as recited in claim 1, wherein each particular receiver among the plurality of receivers is communicatively coupled to the network node by a receiver-specific first VPN channel, wherein the receiver-specific first VPN channel carries only private data specific to that particular receiver, and by the second VPN channel, wherein the second VPN channel carries only the encrypted data broadcast, and wherein the encrypted broadcast is decrypted using the same decryption information that was provided to the first receiver.

4. A method as recited in claim 1, further comprising the steps performed at the network node of:
    detecting that a broadcast server has created a broadcast event; and
    automatically creating a common encryption session that is associated with the second VPN channel.

5. A method as recited in claim 1, wherein the decryption information comprises an encryption dictionary and a frame number.

6. A method as recited in claim 1, further comprising the steps performed at the network node of:
    determining that a new receiver has requested to join the encrypted broadcast data;
    negotiating a new decryption key among the network node and all receivers then in the group; and
    distributing the new decryption key to all current receivers and to the new receiver.

7. A method as recited in claim 1, further comprising the steps performed at the network node of:
    encapsulating the encrypted broadcast data using GRE; and multicasting the encapsulated broadcast data to the first receiver and all other receivers.

8. A method as recited in claim 1, wherein the encrypted broadcast data is generated by a broadcast server, wherein the network node is a VPN concentrator, and wherein each of the receivers is a VPN client.

9. A method as recited in claim 1, wherein the network node is a VPN concentrator, and wherein each of the receivers is a VPN client having a first decryption engine for decrypting the private data and a second decryption engine for decrypting the broadcast data.

10. A method as recited in claim 1, wherein the network node is a VPN concentrator having X+1 encryption/decryption engines, where X is a number of the receivers; and wherein each of the receivers is a VPN client having a first encryption/decryption engine for processing the private data and a second encryption/decryption engine for processing the broadcast data.

11. A computer-readable storage medium storing one or more sequences of instructions for communicating an encrypted data stream to a plurality of receivers, which instructions, when executed by one or more processors, cause the one or more processors to carry out the steps of:

using a virtual private network (VPN) client computer program, establishing a first communication VPN channel between a first one of the receivers and a network node;

communicating a private data stream to the first receiver on the first VPN channel;

receiving a request from the first receiver to join a broadcast data stream;

using the same VPN client computer program, establishing a second encrypted communication VPN channel between the first receiver and the network node;

sending, to the first receiver through the first VPN channel, decryption information with which the first receiver can decrypt information that is sent on the second VPN channel;

wherein the decryption information comprises an encryption dictionary and a frame number, and wherein the first receiver begins recording the encrypted data stream from the specified frame number and uses the encryption dictionary to decrypt the encrypted data stream; and communicating the broadcast data stream to the first receiver on the second VPN channel.

12. A computer-readable storage medium as recited in claim 11, further comprising instructions which, when executed by the one or more processors, cause the one or more processors to carry out the steps of:

detecting that a broadcast server has created a broadcast event; and automatically creating a common encryption session that is associated with the second VPN channel.

13. A computer-readable storage medium as recited in claim 11, further comprising instructions which, when executed by the one or more processors, cause the one or more processors to carry out the steps of:

determining that a new receiver has requested to join the broadcast data stream;

negotiating a new decryption key among the network node and all receivers then in the group; and distributing the new decryption key to all current receivers and to the new receiver.

14. An apparatus for communicating an encrypted data stream to a plurality of receivers, comprising:

means for establishing a first communication virtual private network (VPN) channel between a first one of the receivers and a network node using a VPN client computer program;

means for communicating a private data stream to the first receiver on the first VPN channel;

means for receiving a request from the first receiver to join a broadcast data stream;

means for establishing a second encrypted communication VPN channel between the first receiver and the network node using the same VPN client computer program;

means for sending, to the first receiver through the first VPN channel, decryption information with which the first receiver can decrypt information that is sent on the second VPN channel;

wherein the decryption information comprises an encryption dictionary and a frame number, and wherein the first receiver begins recording the encrypted data stream from the specified frame number and uses the encryption dictionary to decrypt the encrypted data stream; and means for communicating the broadcast data stream to the first receiver on the second VPN channel.

15. An apparatus as recited in claim 14, further comprising:

means for detecting that a broadcast server has created a broadcast event; and means for automatically creating a common encryption session that is associated with the second VPN channel.

16. An apparatus as recited in claim 14, further comprising:

means for determining that a new receiver has requested to join the broadcast data stream;

means for negotiating a new decryption key among the network node and all receivers then in the group; and means for distributing the new decryption key to all current receivers and to the new receiver.

17. An apparatus as recited in claim 14, further comprising:

means for encapsulating the broadcast data stream using GRE; and means for multicasting the encapsulated broadcast data stream to the first receiver and all other receivers.

18. An apparatus for communicating an encrypted data stream to a plurality of receivers, comprising:

a network interface that is coupled to the data network for receiving one or more packet flows therefrom;

a processor;

one or more stored sequences of instructions which, when executed by the processor, cause the processor to carry out the steps of:

using a virtual private network (VPN) client computer program, establishing a first communication VPN channel between a first one of the receivers and a network node;

communicating a private data stream to the first receiver on the first VPN channel;

receiving a request from the first receiver to join a broadcast data stream;

using the same VPN client computer program, establishing a second encrypted communication VPN channel between the first receiver and the network node;

sending, to the first receiver through the first VPN channel, decryption information with which the first receiver can decrypt information that is sent on the second VPN channel;

wherein the decryption information comprises an encryption dictionary and a frame number, and wherein the first receiver begins recording the encrypted data stream from the specified frame number and uses the encryption dictionary to decrypt the encrypted data stream; and communicating the broadcast data stream to the first receiver on the second VPN channel.

19. An apparatus as recited in claim 18, further comprising instructions which, when executed by the one or more processors, cause the one or more processors to carry out the steps of:

detecting that a broadcast server has created a broadcast event; and automatically creating a common encryption session that is associated with the second VPN channel.

20. An apparatus as recited in claim 18, further comprising instructions which, when executed by the one or more processors, cause the one or more processors to carry out the steps of:

determining that a new receiver has requested to join the broadcast data stream;

negotiating a new decryption key among the network node and all receivers then in the group; and distributing the new decryption key to all current receivers and to the new receiver.

21. An apparatus as recited in claim 18, further comprising instructions which, when executed by the one or more processors, cause the one or more processors to carry out the steps of:

encapsulating the broadcast data stream using GRE; and multicasting the encapsulated broadcast data stream to the first receiver and all other receivers.

22. An apparatus for communicating an encrypted data stream to a plurality of receivers, comprising:

means for establishing a first communication virtual private network (VPN) channel between a first one of the receivers and a network node;

means for communicating a private data stream to the first receiver on the first VPN channel;

means for receiving a request from the first receiver to join a particular broadcast data stream from a plurality of broadcast data streams;

means for establishing a second encrypted communication VPN channel between the first receiver and the network node;

means for sending, to the first receiver through the first VPN channel, decryption information with which the first receiver can decrypt information that is sent on the second VPN channel;

wherein the decryption information comprises an encryption dictionary and a frame number, and wherein the first receiver begins recording the encrypted data stream from the specified frame number and uses the encryption dictionary to decrypt the encrypted data stream;

means for encrypting as part of a single session the broadcast data stream; and means for communicating the broadcast data stream to the first receiver on the second channel.

23. A method as recited in claim 1, wherein the private data was requested by the first receiver and is specific to the first receiver.

24. A method as recited in claim 1, wherein the private data further comprises any of email, server resources, or telnet session data.

25. A method as recited in claim 1, wherein the broadcast data stream further comprises a specific event that is multicasted.

* * * * *